United States Patent
Tantot et al.

(10) Patent No.: US 11,821,360 B2
(45) Date of Patent: Nov. 21, 2023

(54) AIRCRAFT PROPULSION SYSTEM AND AIRCRAFT POWERED BY SUCH A PROPULSION SYSTEM BUILT INTO THE REAR OF AN AIRCRAFT FUSELAGE

(71) Applicant: SAFRAN AIRCRAFT ENGINES, Paris (FR)

(72) Inventors: Nicolas Jerome Jean Tantot, Moissy-Cramayel (FR); Francois Gallet, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 527 days.

(21) Appl. No.: 17/256,984

(22) PCT Filed: Jul. 3, 2019

(86) PCT No.: PCT/FR2019/051650
§ 371 (c)(1),
(2) Date: Dec. 29, 2020

(87) PCT Pub. No.: WO2020/008147
PCT Pub. Date: Jan. 9, 2020

(65) Prior Publication Data
US 2021/0140367 A1 May 13, 2021

(30) Foreign Application Priority Data
Jul. 4, 2018 (FR) ...................................... 1856156

(51) Int. Cl.
*F02C 6/14* (2006.01)
*B64D 27/14* (2006.01)
(Continued)

(52) U.S. Cl.
CPC ................ *F02C 6/14* (2013.01); *B64D 27/14* (2013.01); *B64D 27/24* (2013.01); *F01D 1/24* (2013.01);
(Continued)

(58) Field of Classification Search
CPC ..... B64D 27/14; B64D 2027/026; F02C 6/14; F02C 7/36; F05F 2201/323; F05F 2201/76; F05F 2260/42; F01D 1/24
(Continued)

(56) References Cited

U.S. PATENT DOCUMENTS

2017/0320584 A1 11/2017 Menheere
2018/0003071 A1 1/2018 Lents et al.
(Continued)

FOREIGN PATENT DOCUMENTS

CA 3013689 A1 * 2/2019 ............... B64C 1/16
CA 3109112 A1 * 8/2021
(Continued)

OTHER PUBLICATIONS

International Search Report and Written Opinion received for PCT Patent Application No. PCT/FR2019/051650, dated Sep. 30, 2019, 18 pages (8 pages of English Translation and 9 pages of Original Document).

*Primary Examiner* — Christopher P Ellis
(74) *Attorney, Agent, or Firm* — WOMBLE BOND DICKINSON (US) LLP

(57) ABSTRACT

The invention relates to an aircraft propulsion system (100) intended for being built into the rear of an aircraft fuselage, the propulsion system comprising at least two gas generators (102a, 102b) supplying a power turbine (104) having two counter-rotating turbine rotors (104a, 104b) for driving two fans (112a, 12b), and separate air inlets (106a, 106b) for supplying each gas generator, characterised in that it com-
(Continued)

prises an electrical drive device (140) configured to rotate at least one of the turbine rotors, at least one electrical generator (142a, 142b) configured to transform part of the energy of the flow from the gas generators into electrical power and an electric motor (146) supplied by said electrical generator and capable of rotating at least one of the turbine rotors, said electrical generator being installed on one of said gas generators, and in that said turbine rotor is capable of being rotated simultaneously by a flow from said gas generators and by the electrical drive device.

12 Claims, 1 Drawing Sheet

(51) Int. Cl.
 *B64D 27/24* (2006.01)
 *F01D 1/24* (2006.01)
 *F02C 7/36* (2006.01)
 *B64D 27/02* (2006.01)
(52) U.S. Cl.
 CPC .......... *F02C 7/36* (2013.01); *B64D 2027/026* (2013.01); *F05D 2220/323* (2013.01); *F05D 2220/76* (2013.01); *F05D 2260/40311* (2013.01); *F05D 2260/42* (2013.01)

(58) Field of Classification Search
 USPC ...................................................... 244/55, 60
 See application file for complete search history.

(56) References Cited

U.S. PATENT DOCUMENTS

| | | |
|---|---|---|
| 2018/0057150 A1 | 3/2018 | Cheung et al. |
| 2019/0309705 A1* | 10/2019 | Suciu ....................... F02K 3/072 |
| 2019/0382121 A1* | 12/2019 | Schwarz ................... F02C 9/42 |
| 2019/0382123 A1* | 12/2019 | Schwarz ................... F02C 6/20 |
| 2022/0025834 A1* | 1/2022 | Kirkbride .............. B64D 27/12 |
| 2022/0235671 A1* | 7/2022 | Rambo ..................... F02K 3/06 |

FOREIGN PATENT DOCUMENTS

| | | | | |
|---|---|---|---|---|
| DE | 102013209538 A1 | | 11/2014 | |
| EP | 2730501 A2 | | 5/2014 | |
| FR | 2997681 A1 | | 5/2014 | |
| FR | 3056556 A1 | * | 3/2018 | ............. B64D 27/20 |
| FR | 3125018 A1 | * | 1/2023 | |
| WO | 2016/020618 A1 | | 2/2016 | |
| WO | WO-2017013360 A1 | * | 1/2017 | ............. B64D 27/20 |
| WO | WO-2017171678 A1 | * | 10/2017 | |

* cited by examiner

AIRCRAFT PROPULSION SYSTEM AND AIRCRAFT POWERED BY SUCH A PROPULSION SYSTEM BUILT INTO THE REAR OF AN AIRCRAFT FUSELAGE

TECHNICAL AREA AND BACKGROUND

The present invention relates to the field of aircrafts, such as in particular civil aircrafts, powered by a counter-rotating fan propulsion system which is integrated into the rear of an aircraft fuselage as an extension thereof. More specifically, it concerns a device integrated into the propulsion system to provide a combination of aerodynamic and electrical energy to the propulsion system.

The prior art comprises in particular the patent applications WO-A1-2016/020618, US-A1-2018/003071, DE-A1-10 2013 209538, US-A1-2017/320584, US-A1-2018/057150 and EP-A2-2 730 501.

In the applicant's patent application FR-A1-2 997 681, a new aircraft architecture has been proposed which reduces aircraft noise pollution and fuel consumption by limiting aerodynamic drag by absorption of the boundary layer.

In such an architecture, as shown in FIG. 1, an aircraft 1 is powered by a turbomachine, in this case a turbojet engine 10, with counter-rotating ducted fans, the turbomachine being integrated into the rear tip of the fuselage 2 of the aircraft. In operation, this turbojet is equivalent to a twin-engine configuration. Generally, as shown in FIG. 2, the turbojet engine 10 comprises, from upstream to downstream in the direction of the gas flow represented by the arrows F, two separate gas generators 12a, 12b connected in parallel which supply a single power turbine 14. The power turbine 14 comprises two counter-rotating 14a, 14b turbine rotors which rotate two fans 20a, 20b located downstream of the gas generators 12a, 12b. Separate lateral air inlets 18a, 18b are arranged to supply each gas generator 12a, 12b. In this way, the gas generators aerodynamically supply the power turbine. Downstream of the gas generators 12a, 12b, the fans 20a, 20b are arranged in the extension of the fuselage 2 of the aircraft and generally supplied by an annular ring, centred on the axis X, connected to the latter in such a way as to absorb at least a part of the boundary layer formed around the fuselage 2. The diameter of the fans 20a, 20b is of the order of that of the fuselage 2 in its largest section. The rotational speed of the fans 20a, 20b is generally lower than for conventional turbomachines, particularly in order to ensure that the speed at the tip of the blade is subsonic.

However, such an architecture presents problems in maintaining a minimum thrust level, which is roughly equal to 50% of the nominal overall thrust, as well as problems with the robustness of the propulsion system, in the event of failure of a part of the propulsion system.

In addition, there are turbomachines that are also configured to drive auxiliary equipments. Such an architecture has been proposed in the applicant's patent application FR-A1-3 039 206, which comprises a free turbine rotor decoupled from the power turbine and configured to transform a part of the energy of the primary flow coming from the gas generators to mechanical power on an auxiliary rotary shaft and to be coupled to at least one auxiliary equipment, such as an electrical generator. The auxiliary equipment is an equipment not involved in the supply of a thrust by the turbomachine, but which, by performing functions such as generating electricity or circulating fluids, is involved in the operation of either the turbomachine or the aircraft more generally.

In addition, there is a need to minimise the polluting emissions from the combustion of fossil fuels, such as unburned $CO_2$ or NOx emissions.

There is therefore a need for a propulsion system designed to be integrated into the rear of an aircraft fuselage that can maintain a minimum level of thrust and that offers an improved robustness in the event of failure of a part of the propulsion system, while reducing the aircraft's polluting emissions.

The present invention is intended in particular to provide a simple, economic and effective solution to these problems, making it possible to avoid the disadvantages of the known technique.

In particular, the present invention allows the propulsion of the aircraft on the basis of a combination of aerodynamic and electrical energy.

SUMMARY OF THE INVENTION

For this purpose, the invention relates to an aircraft propulsion system intended for being integrated into the rear of an aircraft fuselage, the propulsion system comprising, from upstream to downstream in the direction of a gas flow in the propulsion system, at least two gas generators supplying a power turbine having two counter-rotating turbine rotors for driving two fans arranged downstream of the gas generators, and separate air inlets for supplying each gas generator, characterized in that it comprises an electrical drive device configured to rotate at least one of the turbine rotors and comprising at least one electrical generator configured to transform a part of the energy of the flow coming from the gas generators into electrical power and an electric motor supplied by said electrical generator and capable of rotating at least one of the turbine rotors, said electrical generator being installed on one of said gas generators, and in that said turbine rotor is capable of being rotated simultaneously by a flow coming from said gas generators and by the electrical drive device.

Advantageously, the propulsion system according to the invention makes it possible to supply the aircraft by means of a combination of aerodynamic and electrical energy, and not on the basis of an exclusively aerodynamic energy as in the case of propulsion systems according to the prior art. This has the advantage of reducing the use of fossil fuel, and thus reducing polluting emissions.

The electrical drive device is advantageously dimensioned for the precise need for assistance from the propulsion system, thus minimising the mass impact of said electrical drive device. Moreover, thanks to the electrical assistance provided by the electrical drive device, it is possible to reduce the dimensions of the gas generators of the propulsion system.

In addition, the electrical drive device makes it possible to compensate for the failure of at least one part of the propulsion system according to the invention, thus improving the robustness of the aircraft incorporating this propulsion system.

In addition, the electrical drive device is advantageously upgradeable and reconfigurable according to the state of failure of the elements of the propulsion system according to the invention.

Alternatively, the electrical drive device may comprise a single electric machine, such as a starter/generator, configured to transform some of the energy of the flow coming from the gas generators into electrical power and to rotate at least one of the turbine rotors.

Preferably, the electrical drive device comprises electric energy storage means supplied by the electrical generator and configured to supply the electric motor. The storage means comprise, for example, batteries or super-capacitors.

The storage means may be configured to supply the electric motor for at least three successive full propulsive power flight phases, such as during take-off or climb of the aircraft.

The storage means may be configured to supply to the electric motor during a reduced power flight phase, such as idle, super-idle or ground.

An idle phase is defined as a phase of operation of the propulsion system at a minimum power to meet the non-propulsive energy requirements of the aircraft, such as the electrical and pressurised air requirements of the aircraft.

A super-idle phase is defined as a phase of operation of the propulsion system at a minimum power during which the aircraft's non-propulsive energy requirements are not provided by the propulsion system but are provided by another system of the aircraft.

In this case, at least one of the turbine rotors is capable of being rotated solely by the electrical drive device during a reduced power flight phase.

The storage means may be configured to discharge and supply the electric motor during a full propulsive power flight phase, such as during take-off or climb of the aircraft. The storage means may be configured to recharge during an intermediate propulsive power flight phase, such as cruise flight.

The storage means may be configured to provide at least the propulsive energy in the event of failure of at least one gas generator, and to provide non-propulsive energy in the event of nominal operation, as well as in the event of failure of at least one part of the propulsion system.

Preferably, the gas generators are configured to provide between 80% and 95% of the main primary power to the turbine rotors during a full propulsive power flight phase, such as during take-off. In this case, the storage means and the electric motor may be configured to provide between 5% and 20% of the main primary power to the turbine rotors during a full propulsive power flight phase.

Optionally, the electrical drive device may comprise a reduction gear connected to the electric motor and to the turbine rotors and configured to transform the electrical power supplied by the electric motor into mechanical power on the turbine rotors.

This allows the torque input to each of the turbine rotors to be adapted to the energy requirements.

The reduction gear can be a differential reduction gear.

Of course, the electric motor can drive the turbine rotors directly, i.e. without a reduction gear being connected between the electric motor and the turbine rotors.

The propulsion system may comprise a central vein configured to conduct the flow coming from the gas generators to the power turbine. Preferably, the central vein is configured to reduce the flow rate in the event of failure of at least one of the gas generators.

The propulsion system may comprise a braking device configured to stop the rotation of at least one of the turbine rotors in the event of failure of that turbine rotor. Preferably, the braking device comprises at least one piston configured to come into contact with said turbine rotor.

The gas generators and the turbine rotors may be mechanically independent. In particular, the gas generators and the turbine rotors may be mechanically independent during all the phases of aircraft flight.

The turbine rotors can be configured to directly rotate the fans.

The invention also relates to an aircraft powered by a propulsion system according to the invention, the propulsion system being integrated into the rear of a fuselage of the aircraft.

The invention also relates to a method of using an aircraft propulsion system according to the invention. The method comprises the rotating of at least one of the turbine rotors simultaneously by a flow coming from the gas generators and by the electrical drive device.

In nominal operation mode, during a full propulsive power flight phase of the aircraft, for example during take-off, climb or on-ground braking, i.e. during a reverse thrust, the method may comprise the discharging of the storage means of the electrical drive device into the electric motor of said electrical drive device so as to assist in the rotation of at least one of the turbine rotors.

In nominal operation mode, during an intermediate propulsive power flight phase, for example at the end of a climb or in cruise flight of the aircraft, the method may comprise the rotating of at least one of the turbine rotors solely from a flow coming from the gas generators. In particular, the method may comprise the extraction of an electrical power from the flow of the gas generator to the storage means of the electrical drive device. In other words, the method may comprise charging of the storage means of the electrical drive device. When said storage means are fully charged, the method may comprise stopping the extraction of the electrical power from the flow of the gas generators.

In nominal operation mode, during a reduced propulsive power flight phase, the method may comprise the operation at the limit of the extinction of the gas generator combustion chambers, or the reducing of the rotational speed of the gas generator shafts to a speed corresponding to the minimum to maintain the combustion in the corresponding chambers, as permitted by the re-acceleration capacity of the turbine rotors by the electrical drive device, ensuring rapid availability of the thrust regardless of the operating point of the gas generator. The method may also comprise discharging of the storage means of the electrical drive device to provide non-propulsive power to various aircraft components and/or electrical assistance to the acceleration of the gas generator compressors.

In nominal operation mode, during a phase of reduced propulsive power on the ground, the method may comprise shutting down the gas generators and rotating at least one of the turbine rotors solely from the electrical drive device.

In the event of failure of one of the gas generators, the method may comprise reducing the flow rate of the flow coming from the gas generators to the power turbine and rotating at least one of the turbine rotors from a flow coming from the other gas generators and the electrical drive device.

In the event of failure of both gas generators, the method may comprise rotating at least one of the turbine rotors solely from the electrical drive device.

In the event of failure of all or part of the thruster, the method may comprise braking the rotation of the turbine rotors so as to slow and then stop the rotation of the turbine rotors.

For the purposes of the invention, the propulsion system comprises a thruster and gas generators, a thruster comprising all the turbine rotors and fans located downstream of the aircraft and producing the propulsive effort.

In the latter case, the method may comprise stopping the extraction of the electrical power from the flow of gas generators. In addition, the method may comprise discharging the storage means of the electrical drive device so as to provide non-propulsive energy to various aircraft components.

BRIEF DESCRIPTION OF FIGURES

The present invention shall be better understood and other details, characteristics and advantages of the present invention shall appear more clearly on reading the description of a non-limiting example which follows, with reference to the annexed drawings on which.

DETAILED DESCRIPTION OF THE INVENTION

The invention relates to an aircraft powered by a propulsion system integrated into the rear of a fuselage of the aircraft.

Figure 3:
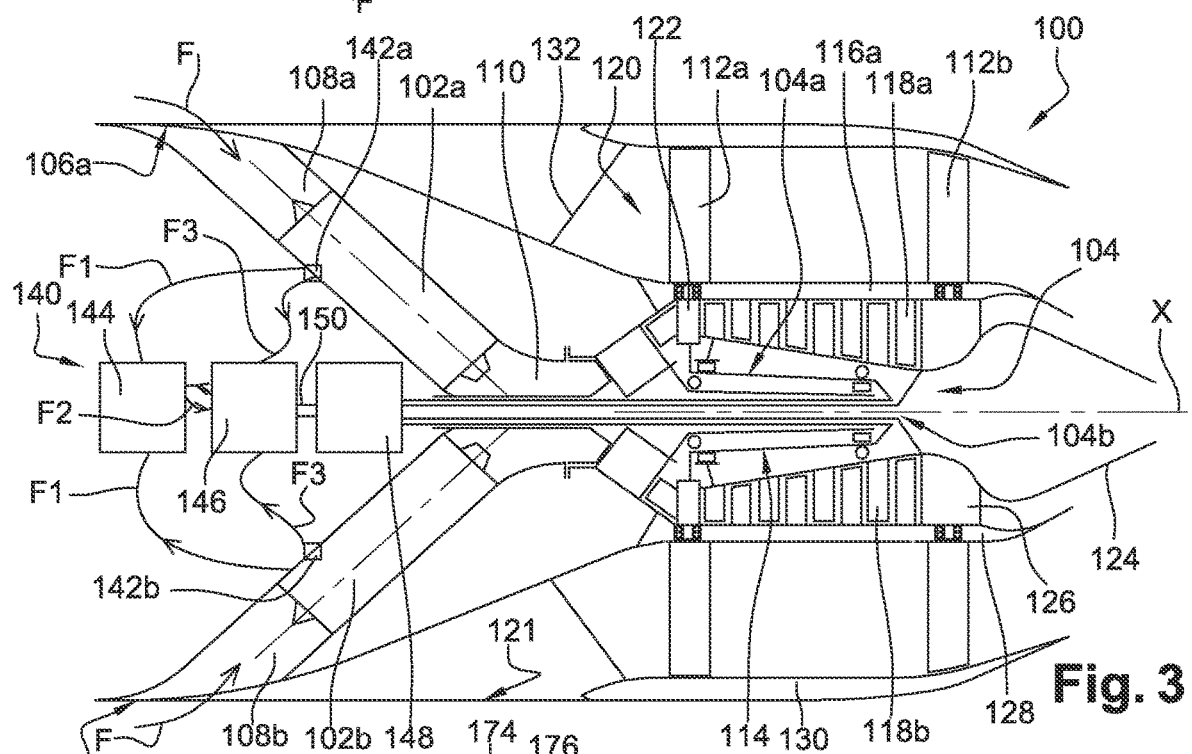
FIG. 3 represents a cross section view of an aircraft propulsion system according to the invention.

FIG. 3 shows a propulsion system 100 of an aircraft according to the invention which comprises, from upstream to downstream in the direction of gas flow represented by the arrows F, two separate gas generators 102a, 102b connected in parallel which supply a power turbine 104. Separate air inlets 106a, 106b are arranged to supply each gas generator 102a, 102b. In order to optimise the thermal efficiency of the gas generators, the air inlets 106a, 106b are arranged so that the gas generators 102a, 102b do not ingest a boundary layer.

Each gas generator 102a, 102b may comprise at least one compressor, e.g. one low-pressure and one high-pressure compressor, one combustion chamber and at least one turbine, e.g. one low-pressure turbine and one high-pressure turbine.

Each gas generator 102a, 102b is housed within a primary flow vein 108a, 108b. As shown in FIG. 3, the primary flow veins 108a, 108b converge on the longitudinal axis, noted X, of the aircraft and form an upstream-open "V" between them, preferably with an opening angle between 80° and 120°. The two primary flow veins 108a, 108b converge in a central vein 110 which powers the power turbine 104.

The central vein 110 is configured to conduct the flow coming from the gas generators 102a, 102b to the power turbine 104. In the event of failure of at least one of the gas generators 102a, 102b, the central vein 110 may be configured to reduce the flow rate of the flow coming from the gas generators 102a, 102b to the power turbine 104. In other words, the cross section of the central vein 110 may be restricted in the event of failure of at least one of the gas generators 102a, 102b.

A mixer can be positioned at the convergence zone 110 of the primary flow veins 108a, 108b to mix the gas flows from the two gas generators 102a, 102b to create a single, homogeneous gas flow to supply the power turbine 104.

The power turbine 104 comprises two counter-rotating turbine rotors 104a, 104b which counter-rotate two fans 112a, 112b arranged downstream of the gas generators 102a, 102b. In other words, the turbine rotors 104a, 104b are rotationally connected to the fans 112a, 122b. The turbine rotors 104a, 104b rotate directly the fans 112a, 112b. The turbine rotors 104a, 104b are coaxial and centred on the longitudinal Axis X of the aircraft. The turbine rotors 104a, 104b rotate around a central casing 114 attached to the aircraft structure.

Air inlets 121 are arranged to supply the fans 112a, 112b. The air inlets 121 are arranged so that the boundary layer is ingested by the thrusters, i.e. the boundary layer is ingested through the air inlets 121. Specifically, the fans are supplied by all or part of the boundary layer formed around the aircraft fuselage 2. A low speed of the boundary layer allows a low intake speed, and therefore a low ejection speed, of the gases passing through the propulsion system, resulting in a high propulsive efficiency.

One of the turbine rotors 104a, known as the first turbine rotor, comprises a tubular body 116a on which blades 118a are arranged. The body 116a of the first rotor 104a separates the primary flow vein, i.e. the central vein 110 in the power turbine 104, from the secondary flow vein 120 in which the fans 112a, 112b are located. The blades 118a and the body 116a of the first rotor 104a are connected to the rotor support bearings on the central casing 114 by support arms 122 which pass through the central vein 110 upstream of the power turbine 104.

The other of the turbine rotors 104b, known as the second turbine rotor, comprises blades 118b connected to a radially inner wall of the central vein 110 in the power turbine 104 and longitudinally interposed between the blades 118a of the first turbine rotor 104b.

Downstream of the power turbine 104, the radially inner wall of the central vein 110 extends into a central body 124. As shown in FIG. 3, this wall is connected by support arms 126 to a support ring 128 for the blades 118b of the downstream fan 112b. The ring 128 extends the body 116a of the first rotor 104a and comprises a rearward extension so as to form, together with the central body 124, a primary exhaust nozzle at the outlet of the power turbine 104.

In FIG. 3, the upstream fan 112a, referred to as the first fan, is positioned at the inlet of the power turbine 104. The first fan 112a is connected to the first rotor 104a at the support arms 122 which support the body 116a of the first rotor 104a upstream. Thus, the first fan 112a rotates at the same speed as the first rotor 104a of the power turbine 104.

The downstream fan 112b, referred to as the second fan, is positioned at the outlet of the power turbine 104. The second fan 112b is connected to the second rotor 104b at the support ring 128 and the support arms 126 which support it. The second fan 112b thus rotates at the same speed as the second rotor 104b of the power turbine 104.

Figure 1:
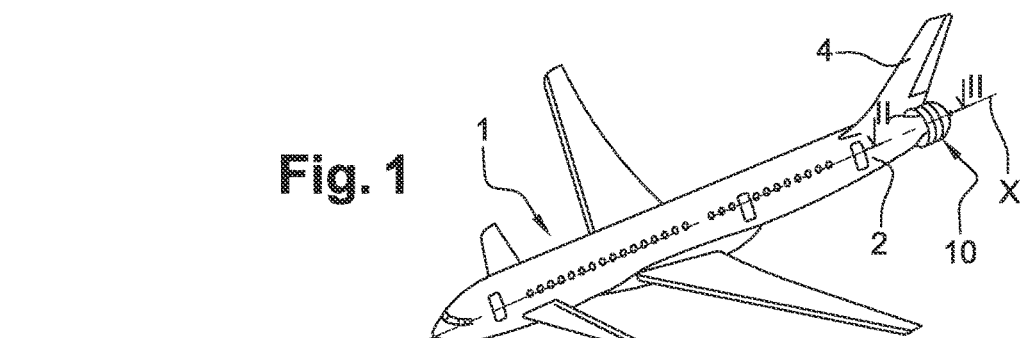
FIG. 1 represents a schematic and perspective view of an aircraft powered by a turbojet engine according to the prior art.
Figure 2:
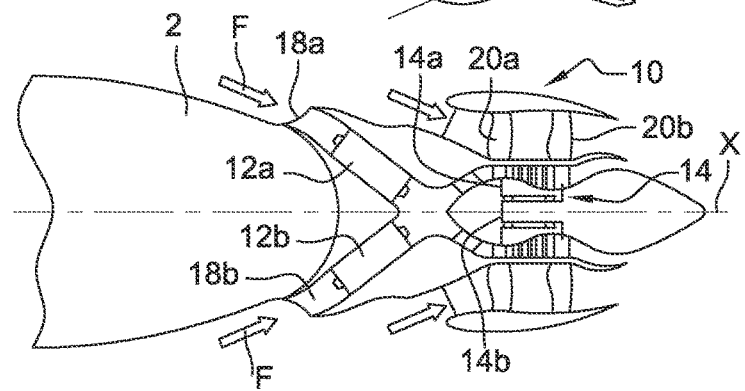
FIG. 2 represents a II-II cross section view of the turbojet engine of the aircraft of FIG. 1.

The fans 112a, 112b are shrouded by a nacelle 130 attached to the aircraft structure. In particular, the nacelle 130 is attached to the vertical stabilizer of the aircraft, referenced 4 in FIG. 1.

The fans 112a, 112b are mounted in series in the secondary flow vein 120. Thus, the propulsion system 100 is a dual-flow system.

As the fans 112a, 112b are connected in series, in the event of failure of one of the fans, the other fan can take over.

Similarly, since the power turbine 104 is supplied by two gas generators 102a, 102b, in the event of failure of one of the gas generators, the other gas generator can continue to supply the power turbine.

The propulsion system 100 also comprises a stator 132 consisting of a ring of blades connecting the nacelle 130 to the aircraft fuselage 2 upstream of the upstream fan 112a.

This stator 132 can advantageously be used to improve the efficiency of the upstream fan, for example by acting as a rectifier.

The propulsion system 100 also comprises an electrical drive device 140 configured to rotate at least one of the turbine rotors 104a, 104b.

At least one of the turbine rotors 104a, 104b is capable of being rotated simultaneously by a flow coming from the gas generators 102a, 102b and by the electrical drive device 140. For example, the first turbine rotor 104a may be rotated by both a flow coming from the gas generators 102a, 102b and by the electrical drive system 140, while the second turbine rotor 104b may be rotated solely by a flow coming from the gas generators 102a, 102b.

The first turbine rotor 104a may be rotated solely by the electrical drive device 140, whereas the second turbine rotor 104b may be rotated simultaneously by a flow coming from the gas generators 102a, 102b and by the electrical drive device 140.

The first turbine rotor 104a can also be rotated solely by the electrical drive device 140, whereas the second turbine rotor 104b can be rotated solely by a flow coming from the gas generators 102a, 102b.

The two turbine rotors 104a, 104b can also, for example, be rotated simultaneously by a flow coming from the gas generators 102a, 102b and by the electrical drive device 140.

The two turbine rotors 104a, 104b can also be rotated solely by a flow coming from the gas generators 102a, 102b.

The two turbine rotors 104a, 104b can, for example, be rotated solely by the electrical drive device 140.

The electrical drive device 140 comprises at least one electrical generator configured to transform some of the energy of the flow coming from the gas generators 102a, 102b into electrical power. Preferably, the electrical drive device 140 comprises two electrical generators 142a, 142b, each electrical generator being installed on a gas generator 102a, 102b. Specifically, one electrical generator 142a, 142b is installed on one of the shafts of one gas generator 102a, 102b, and preferably on the low pressure shaft of the gas generator.

The electrical drive device 140 also comprises electric energy storage means 144 supplied by the electrical generator(s) 142a, 142b. The storage means 144 are preferably arranged in the vicinity of the electrical generators 142a, 142b. In FIG. 3, the arrows F1 represent the power supply of the storage means 144 from the electrical generators 142a, 142b. The storage means 144 comprise, for example, batteries or supercapacitors.

The storage means 144 are configured to supply an electric motor 146. In FIG. 3, the arrow F2 represents the power supply of the electric motor 146 from the storage means 144.

Alternatively, the electrical drive device 140 may comprise, instead of the electrical generators 142a, 142b and the electric motor 146, a single electric machine, such as a starter/generator. The electric machine can be configured to transform a part of the energy of the flow coming from the gas generators 102a, 102b into electrical power and to rotate at least one of the turbine rotors 104a, 104b. Specifically, the starter/generator can combine the functions provided separately by the electrical generators 142a, 142b and the electric motor 146.

The storage means 144 are configured to be recharged by the gas generators 102a, 102b via the electrical generators 142a, 142b and to discharge, for example, into the electric motor 146.

In particular, the storage means 144 are configured to supply the electric motor 146 for at least three successive full-power flight phases. In other words, the storage capacity of the storage means 144 is designed to provide at least three phases of full propulsive power flight, for example one climb phase and two take-off phases, or their equivalent in terms of power consumption. These flight phases are carried out by the storage means 144 successively and without recharging the storage means 144. This makes it advantageous to cover the case where a go-around is required during an emergency landing immediately following an initial take-off.

The storage means 144 can be configured to supply the electric motor 146 during a reduced power flight phase, such as idle, super-idle or ground. In particular, at least one of the turbine rotors 104a, 104b can be rotated solely by the electrical drive device 140 during a reduced power flight phase. In other words, the capacity of the storage means 144 is configured to cover the aircraft's ground evolutions in all-electric mode. In this configuration, the gas generators 102a, 102b can be switched off, i.e. the combustion chambers of the gas generators can be switched off.

The storage means 144 may also be configured to cover a plurality of transitional assistance to the compressor accelerations of the gas generators 102a, 102b.

The electric motor 146 is supplied by the electrical generator(s) 142a, 142b, or by the storage means 144. In FIG. 3, the arrows F3 represent the power to the electric motor 146 from the electrical generators 142a, 142b.

The electric motor 146 is capable of rotating at least one of the turbine rotors 104a, 104b.

The electric motor 146 can rotate the turbine rotors 104a, 104b via a reduction gear 148, e.g. a differential reduction gear, planetary or epicyclic type reduction gear. In this case, the reduction gear 148 is connected to the electric motor 146 and to the turbine rotors 104a, 104b, and is configured to transform the electrical power supplied by the electric motor 146 into mechanical power on the turbine rotors 104a, 104b. As shown in FIG. 3, the reduction gear 148 is connected upstream to the electric motor 146 by a shaft 150 and downstream to the turbine rotors 104a, 104b. The reduction gear 148 thus participates in the power generation that rotates the counter-rotating fans 112a, 112b.

In particular, at least one of the turbine rotors 104a, 104b is rotated both by the gas flow from the gas generators 102a, 102b passing through the central vein 110, and by the electric motor 146 via a reduction gear 148.

The gas generators 102a, 102b are configured to provide between 80% and 95% of the main primary power to the turbine rotors 104a, 104b during a full propulsive power flight phase, such as during take-off. The additional power is provided by the storage means 144 and the electric motor 146. In other words, the storage means 144 and the electric motor 146 are configured to provide between 5% and 20% of the main primary power to the turbine rotors 104a, 104b during a full propulsive power flight phase. For example, the gas generators 102a, 102b can provide 90% of the main primary power to the turbine rotors 104a, 104b, and the storage means 144 and electric motor 146 then provide 10% of the main primary power to the turbine rotors 104a, 104b.

In the event of failure of a turbine rotor 104a, 104b the electric motor 146 can be configured to exert a negative torque to slow or stop the rotation of said turbine rotor via the reduction gear 148.

In addition, the propulsion system 100 may comprise a braking device configured to stop the rotation of at least one of the turbine rotors 104a, 104b in the event of failure of the said turbine rotor, in order to enable the aircraft to return to an airport by minimising the parasitic drag and the risk of overspeed of the failed propulsion rotor.

Figure 4:
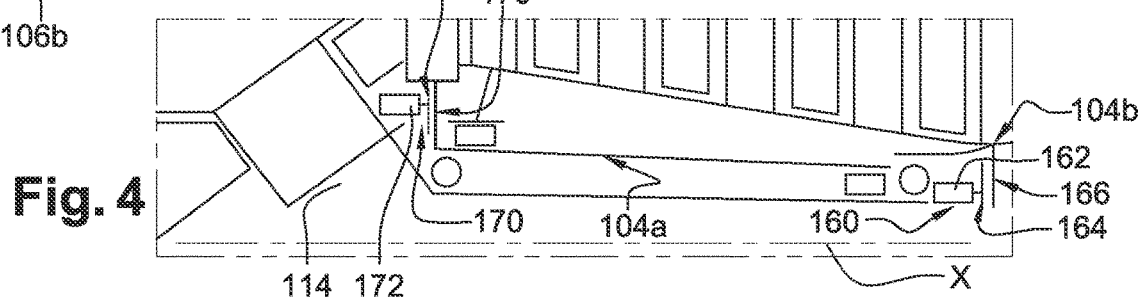
FIG. 4 represents a cross section view of a part of an aircraft propulsion system according to an embodiment of the invention.

For example, as shown in FIG. 4, the propulsion system 100 may comprise a first braking device 170 associated with the first turbine rotor 104a and configured to come into contact with the first turbine rotor 104a to slow and then stop it, and a second braking device 160 associated with the second turbine rotor 104b and configured to come into contact with the second turbine rotor 104b to slow and then stop it.

These first and second braking devices 160, 170 can be activated independently to select the turbine rotor which has to be stopped.

These first and second braking devices 160, 170 can take the form of discs 164, 174 attached to the central casing 114 and pressing on a corresponding part of the turbine rotors 104a, 104b.

The part fixed to the central casing 114 of the first braking device 170 can be accommodated in a free space between the central casing 114 and the upstream part of the first turbine rotor 104a. A piston 172 pushes the disc 174 against a part 176 of the web of the first turbine rotor 104a located on the axis X straight above the upstream fan 112a. Thus, the first turbine rotor 104a is blocked by the first braking device 170 at the level where the forces are exerted on the first turbine rotor 104a by the upstream fan 112a. This prevents torques from being exerted between the first braking device 170 and the fan 112a over the length of the first turbine rotor 104a when the latter is stopped.

Similarly, the part fixed to the central casing 114 of the second brake unit 160 can be accommodated in a free space between the central casing 114 and the downstream part of the second turbine rotor 104b. A piston 162 pushes the disc 164 against a part 166 of the web of the second turbine rotor 104b located on the axis X straight above the downstream fan 112b.

The different modes of operation of the propulsion system according to the invention will now be described.

In the nominal mode of operation, i.e. without failure of the propulsion system, a distinction is made between the cases of operation at full propulsive power of the aircraft, the cases of operation at intermediate propulsive power and the cases of operation at reduced propulsive power in flight and on the ground. The operation at full propulsive power of the aircraft corresponds to phases of flight such as during take-off or climb of the aircraft. The gas generators 102a, 102b are configured to operate at maximum capacity and supply hot gases that rotate the turbine rotors 104a, 104b through the power turbine 104. The storage means 144 are configured to discharge, i.e. they supply the electric motor 146 and at least one of the turbine rotors, e.g. both turbine rotors 104a, 104b, through the power turbine 104. Specifically, at least one of the turbine rotors 104a, 104b is rotated by both the flow coming from the gas generators 102a, 102b and by the storage means 144 and the electric motor 146 of the electrical drive device 140.

The operation at intermediate propulsive power corresponds to the phases of flight such as cruising flight. The gas generators 102a, 102b are configured to operate at maximum capacity. The gas generators 102a, 102b supply, as long as the storage means 144 are not fully charged, all the propulsive power through the hot gases emitted, then transformed by the power turbine 104. In other words, at least one of the turbine rotors 104a, 104b is rotated solely by the flow coming from the gas generators 102a, 102b. The gas generators 102a, 102b also supply all the non-propulsive power required by the aircraft, as well as a surplus of energy to recharge the storage means 144. The electrical generators 142a, 142b are configured to extract an electrical power from the flow of the gas generators 102a, 102b to storage means 144. Thus, the storage means 144 are configured to recharge. Once the storage means 144 are fully charged, the electrical generators 142a, 142b are configured to stop the extraction of electrical power from the flow of the gas generators 102a, 102b. The gas generators 102a, 102b then operate at a reduced speed to supply the propulsive and non-propulsive energy required to maintain the aircraft. Advantageously, reducing the speed of the gas generators makes it possible to minimise the polluting emissions. Indeed, reducing the speed of the gas generators makes it possible to reduce the combustion of fossil fuel, which in turn reduces the polluting emissions, such as unburned $CO_2$ or NOx emissions.

When operating at reduced propulsive power flight of the aircraft, i.e. at idle speed, the gas generators 102a, 102b can operate in "super-idle" speed, i.e. at a low rotation speed of the gas generator shafts with the combustion chamber operating at the limit of its extinction. In the super-idle speed, the combustion chambers of the gas generators burn the minimum amount of fuel possible to ensure the operation of the gas generators. Advantageously, the capability to operate the gas generators in this mode makes it possible to minimise the polluting emissions, while meeting the propulsive effort and non-propulsive energy requirements of the aircraft. The turbine rotors 104a, 104b can be in "windmilling" mode, i.e. free rotation of the fans 112a, 122b. The storage means 144 are then configured to supply punctually to the turbine rotors 104a, 104b propulsive power for a rapid re-acceleration of these rotors. This punctual supply of propulsive power is carried out until the gas generators 102a, 102b are returned to their normal operating range. In other words, the storage means 144 are configured to re-accelerate the turbine rotors 104a, 104b in such a way as to guarantee the availability of the full power thrust in a minimum time depending on the characteristics of the propulsion system. The storage means 144 are also configured to supply a non-propulsive energy, such as air at minimum pressure or mechanical power, to various aircraft components. The storage means 144 may be configured to supply an electrical assistance for acceleration of the compressors of the gas generators 102a, 102b. This has the advantage of limiting the excursion phenomenon to the pumping. The compressors of the gas generators 102a, 102b can then be designed with a lower pumping margin. This is because the pumping margin is influenced by excursions to the pumping during aircraft acceleration manoeuvres. This results in a higher compressor efficiency and therefore a lower polluting emissions. In addition, this makes it possible a better compressor operability, which limits the minimum residual thrust, particularly when the turbojet is operating at idle, and therefore makes it possible to optimise the flight profile of the aircraft to allow a rapid descent of the aircraft.

When operating at reduced propulsive power during the ground evolutions of the aircraft, i.e. at or near idle speed, the gas generators 102a, 102b can be switched off. Indeed, if the state of charge of the storage means 144 is sufficient, the gas generators 102a, 102b are switched off and the propulsive power of the aircraft is supplied by the electrical drive device 140. In this case, at least one of the turbine rotors 104a, 104b is rotated solely by electrical drive device 140. The propulsion system 100 then doesn't emit polluting emissions. If the state of charge of the storage means 144 is insufficient, the gas generators 102a, 102b operate in idle mode. In this case, at least one of the turbine rotors 104a, 104b is rotated by both the flow coming from the gas generators 102a, 102b and from the electrical drive device 140. This mode of operation may also be applied to a phase of slowing down and braking on the ground of the aircraft, generally realised by reverse thrust: the rotating of the turbine rotors 104a, 104b in "reverse" mode is provided by the electrical drive device 140, combined with the activation of air flow reversal equipment, for example grille-type or door-type, located on the nacelle 130 (not described here), while the gas generators 102a, 102b remain switched off or in operation at a very low power. This use minimises polluting emissions during the ground deceleration phase on landing, and avoids an additional high-power cycle that is detrimental to the life of the gas generators.

In the event of failure of one of the gas generators 102a, 102b, the central vein 110 can be configured to reduce, for example to halve, the throughput capacity of the flow coming from the gas generators 102a, 102b and being transmitted to the power turbine 104. The non-faulty gas generator is configured to operate at maximum capacity and the storage means 144 are configured to support the generation of the thrust. In other words, the storage means 144 can be configured to supply at least propulsive energy. Specifically, at least one of the turbine rotors 104a, 104b is rotated by both the flow coming from the non-faulty gas generator and the electrical drive device 140. These configurations of the central vein, the non-faulty gas generator and the storage means allow the propulsion system to supply more than 50% of the capacity of the propulsion system in nominal operation mode.

In the event of simultaneous failure of both gas generators 102a, 102b, the storage means 144 are configured to operate at maximum capacity, thus ensuring a minimum thrust, while maintaining some non-propulsive energy generation. In other words, at least one of the turbine rotors 104a, 104b is rotated solely by the electrical drive device 140.

In the event of failure of all or part of the thruster, the gas generators 102a, 102b are configured to operate at maximum capacity. The first and second braking devices 160, 170 are configured to block the rotation of the failed turbine rotor(s) 104a, 104b. Thus, the braking devices stop any rotation of the turbine rotors 104a, 104b in the central vein 110. The electric motor 146 can be configured to exert a negative torque to assist in slowing and stopping the rotation of the turbine rotors 104a, 104b via the reduction gear 148. The electrical generators 142a, 142b are configured to stop the extraction of electrical power from the flow of the gas generator 102a, 102b to the storage means 144. In the event of simultaneous failure of both rotors of the thruster, the hot gas flows from the gas generators 102a, 102b are directly expanded in the nozzle formed by the ejection part of the propulsion system and generate an emergency thrust in direct jet mode. This provides more than 50% of the total thrust of the propulsion system. The storage means 144 are configured to discharge and supply non-propulsive energy to the various aircraft components.

The invention also relates to a method of using an aircraft propulsion system 100 according to the invention.

In the nominal operation mode, i.e. without failure of the propulsion system 100, the method may comprise a step of rotating at least one of the turbine rotors 104a, 104b simultaneously from a flow coming from the gas generators 102a, 102b and from the electrical drive device 140 during a full propulsive power flight phase, such as during take-off or climb of the aircraft. This rotating step may comprise a substep of discharging the storage means 144 into the electric motor 146 so as to rotate at least one of the turbine rotors 104a, 104b.

The method may comprise a step of rotating at least one of the turbine rotors 104a, 104b solely from a flow coming from the gas generators 102a, 102b during an intermediate propulsive power flight phase. In particular, the method may comprise a step of extracting an electrical power from the flow from the gas generators 102a, 102b to the storage means 144. In other words, the method may comprise a step of charging the storage means 144. Once the storage means 144 are fully charged, the method may comprise a step of stopping the extraction of the electrical power from the flow of the gas generators 102a, 102b.

The method may comprise a step of operating the gas generators in a "super-idle" speed during a reduced propulsive power flight phase, i.e. an operational phase during which the combustion chambers of the gas generators 102a, 102b are at the limit of extinction and a phase of reducing the rotational speed of the shafts of the gas generators 102a, 102b. In addition, the method may comprise a step of re-acceleration of the turbine rotors 104a, 104b by the electrical drive device 140. In "super-idle" speed, the gas generator combustion chambers are still supplied and rotate the gas generator compressors and turbines at a very low speed, i.e. at the limit of extinction. The gas generators cannot then respond, in the minimum time required by the regulations, to a sudden demand for a return to a higher energy speed. Advantageously, the electrical drive device 140 makes this situation possible, by making it possible to supply, almost instantaneously, the required power to the thruster, while the gas generators make the transition from the "super-idle" speed to the speed required to supply the required thrust.

The method may also comprise a step of discharging the storage means 144 so as to supply non-propulsive energy to different components of the aircraft. The method may also comprise a step of discharging the storage means so as to supply an electrical assistance to accelerate the compressors of the gas generators 102a, 102b.

Depending on the state of charge of the storage means 144, the method may comprise a step of shutting down the gas generators 102a, 102b and a step of rotating at least one of the turbine rotors 104a, 104b only from the electrical drive device 140 during a phase of reduced propulsive power on the ground. Alternatively, depending on the state of charge of the storage means 144, the method may comprise a step of rotating at least one of the turbine rotors 104a, 104b from both the flow coming from the gas generators 102a, 102b and the electrical drive device 140.

In the event of failure of one of the gas generators, the method may comprise a step of reducing the flow rate of the flow coming from the gas generators 102a, 102b to the power turbine 104 and a step of rotating at least one of the turbine rotors 104a, 104b from a flow coming from the other of the gas generators and the electrical drive device 140. Specifically, the step of reducing the flow rate comprises a sub-step of restricting the cross-sectional area of the central vein 110 so as to reduce the flow rate of the flow from the gas generators 102a, 102b and transmitted to the power turbine 104.

In the event of failure of both gas generators 102a, 102b, the method may comprise a step of rotating at least one of the turbine rotors 104a, 104b only from the electrical drive device 140.

In the event of failure of all or part of the thruster, the method may comprise a step of braking the rotation of at least one of the turbine rotors 104*a*, 104*b*, preferably both turbine rotors, so as to slow down and then stop the rotation of said turbine rotor. The method may comprise a step of stopping the extraction of the electrical power from the flow of the gas generators 102*a*, 102*b*. In addition, the method may comprise a step of discharging the storage means 144 so as to supply non-propulsive energy to various aircraft components.

The invention has been presented preferentially in the case of a propulsion system integrated into the rear tip of an aircraft fuselage with two gas generators. Of course, the invention is by no means limited to the embodiments described and illustrated, which are given only as examples. On the contrary, it is also conceivable to use more than two gas generators, for example three gas generators, to supply the power turbine, or any other high-energy air source, without going beyond the scope of the invention.

The invention claimed is:

1. An aircraft propulsion system intended for being integrated into the rear of an aircraft fuselage, the propulsion system comprising, from upstream to downstream in the direction of a gas flow in the propulsion system, at least two gas generators supplying a power turbine having two counter-rotating turbine rotors for driving two fans disposed downstream of the gas generators, and separate air inlets for supplying each gas generator, characterised in that it comprises an electrical drive device configured to rotate at least one of the turbine rotors and comprising at least one electrical generator configured to transform part of the energy of the flow coming from the gas generators into electrical power and an electric motor supplied by said electrical generator and capable of rotating at least one of the turbine rotors, said electrical generator being installed on one of said gas generators, and in that said turbine rotor is capable of being rotated simultaneously by a flow coming from said gas generators and by the electrical drive device.

2. The propulsion system according to claim 1, wherein the electrical drive device comprises electric energy storage means supplied by said electrical generator and configured to supply said electric motor.

3. The propulsion system according to claim 2, wherein said storage means are configured to supply said electric motor for at least three successive full propulsive power flight phases, such as during take-off or climb of the aircraft.

4. The propulsion system according to claim 2, wherein said storage means are configured to supply said electric motor during a reduced power flight phase, such as idle, super-idle or ground, and wherein at least one of the turbine rotors is capable of being rotated solely by the electrical drive device during a reduced power flight phase.

5. The propulsion system according to claim 2, wherein said gas generators are configured to provide between 80% and 95% of the main primary power to the turbine rotors during a full propulsive power flight phase, such as during take-off, and said storage means and said electric motor are configured to provide between 5% and 20% of the main primary power to the turbine rotors during a full propulsive power flight phase.

6. The propulsion system according to claim 2, wherein said storage means are configured to discharge and supply the electric motor during a full propulsive power flight phase, such as during take-off or climb of the aircraft, and to recharge during an intermediate propulsive power flight phase, such as a cruise flight.

7. The propulsion system according to claim 1, wherein the electrical drive device comprises a reduction gear connected to said electric motor and to the turbine rotors and configured to transform electrical power from said electric motor to mechanical power on said turbine rotors.

8. The propulsion system according to claim 7, wherein the reduction gear is a differential reduction gear.

9. The propulsion system according to claim 1, wherein the gas generators and the turbine rotors are mechanically independent.

10. The propulsion system according to claim 1, in which the turbine rotors are configured to directly rotate the fans.

11. An aircraft powered by a propulsion system according to claim 1, the propulsion system being integrated into the rear of a fuselage of the aircraft.

12. A method of using an aircraft propulsion system according to claim 1, comprising the rotating of at least one of the turbine rotors simultaneously by a flow coming from said gas generators and by the electrical drive device.

* * * * *